(12) United States Patent
Komano et al.

(10) Patent No.: US 8,723,547 B2
(45) Date of Patent: *May 13, 2014

(54) SOLAR PHOTOVOLTAIC JUNCTION BOX

(75) Inventors: Haruyasu Komano, Hitachi (JP); Kazuo Kotani, Hitachi (JP); Naofumi Chiwata, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,133

(22) Filed: Jun. 29, 2012

(65) Prior Publication Data

US 2013/0009662 A1    Jan. 10, 2013

(30) Foreign Application Priority Data

Jul. 4, 2011   (JP) ................................. 2011-148427

(51) Int. Cl.
*G01R 31/26*   (2006.01)
(52) U.S. Cl.
USPC .............. 324/761.01; 324/750.01; 324/551; 320/107; 307/112; 307/113
(58) Field of Classification Search
USPC .............. 324/537, 761.01, 71, 750.01, 551; 320/107; 307/112, 113
See application file for complete search history.

(56) References Cited

U.S. PATENT DOCUMENTS

| | | | |
|---|---|---|---|
| 6,593,520 B2 | 7/2003 | Kondo et al. | |
| 6,812,396 B2 * | 11/2004 | Makita et al. | 136/244 |
| 6,858,791 B2 * | 2/2005 | Erban | 136/244 |
| 7,161,082 B2 * | 1/2007 | Matsushita et al. | 136/244 |
| 2001/0023703 A1 | 9/2001 | Kondo et al. | |
| 2002/0195136 A1 * | 12/2002 | Takabayashi et al. | 136/244 |
| 2012/0049879 A1 * | 3/2012 | Crites | 324/761.01 |
| 2012/0286961 A1 * | 11/2012 | Komano et al. | 340/653 |
| 2012/0325288 A1 * | 12/2012 | Jang et al. | 136/246 |

FOREIGN PATENT DOCUMENTS

| | | |
|---|---|---|
| JP | 2001-068706 A | 3/2001 |
| JP | 3754898 B2 | 3/2006 |
| JP | 2008-091828 A | 4/2008 |
| JP | 2011-066320 A | 3/2011 |

* cited by examiner

*Primary Examiner* — Huy Q Phan
*Assistant Examiner* — Adam Clarke
(74) *Attorney, Agent, or Firm* — McGinn IP Law Group, PLLC

(57) ABSTRACT

A solar photovoltaic junction box for being electrically connected to a solar cell array. The junction box comprises a plurality of input branch lines electrically connected to solar cell strings, an output aggregate line that converges the plurality of branch lines, a back-flow preventing diode provided on each of the branch lines, a capacitor parallel-connected to each of the back-flow preventing diodes, an AC voltage generator that is provided on the aggregate line to allow an AC voltage to be applied to the solar cell array, a measuring means for measuring an alternating current flowing in the solar cell array, and a control unit comprising an malfunction determination portion for determining a malfunction in the solar cell array on the basis of the AC voltage applied by the AC voltage generator and the alternating current measured by the measuring means.

8 Claims, 7 Drawing Sheets

3 AC VOLTAGE GENERATOR
4b RECEIVER
5 CONTROL UNIT
6 MALFUNCTION DETERMINATION PORTION
9 ALARM MEANS

3 AC VOLTAGE GENERATOR
4b RECEIVER
5 CONTROL UNIT
6 MALFUNCTION DETERMINATION PORTION
9 ALARM MEANS

3 AC VOLTAGE GENERATOR
4b RECEIVER
5 CONTROL UNIT
6 MALFUNCTION DETERMINATION PORTION
9 ALARM MEANS

71 AC VOLTAGE GENERATOR
72 RECEIVER

SOLAR PHOTOVOLTAIC JUNCTION BOX

The present application is based on Japanese patent application No. 2011-148427 filed on Jul. 4, 2011, the entire contents of which are incorporated herein by reference.

BACKGROUND OF THE INVENTION

1. Field of the Invention

The invention relates to a solar photovoltaic junction box for collecting and outputting power generated by each of solar cell strings of a solar cell array, and in particular, to a solar photovoltaic junction box with a function of determining malfunction such as failure, etc., in a solar cell array.

2. Description of the Related Art

The Patent Literature 1 is a conventional method of determining malfunction such as failure, etc., in a solar cell array. Note that, the solar cell array is provided with plural solar cell strings each of which is formed by connecting plural solar cell panels in series.

The Patent Literature 1 discloses a method in which a defect location in a solar cell string is detected by measuring capacitance of the solar cell string. However, the Patent Literature 1 has a problem that it is not possible to determine malfunction in the solar cell string while the solar cell string is generating power since the capacitance of the solar cell string needs to be measured in a state of being separated from a system On the hand, in a solar photovoltaic system having a solar cell array provided with plural solar strings, a solar photovoltaic junction box (also called combiner box) which collects power generated by each solar cell string and outputs the power to a power conditioner, etc., is generally used.

An example of a conventionally used solar photovoltaic junction box is shown in FIG. 6.

A solar photovoltaic junction box 61 shown in FIG. 6 is provided with plural input branch lines H electrically connected to respective solar cell strings 102 and an output aggregate line 12 which converges the plural branch lines 11 to collect power input from each of the solar cell strings 102 via the plural branch lines 11 and to output the power to a power conditioner 13, etc. FIG. 6 shows an example in which a solar cell array 101 is composed of four solar cell strings 102 and each solar cell string 102 is composed of four solar cell panels 103.

A back-flow preventing diode 14 for blocking a current flowing from the aggregate line 12 toward the solar cell string 102 is provided on each of the branch lines The back-flow preventing diode 14 is to prevent back-flow of the current caused by a difference in voltage level between the individual solar cell strings 102.

In addition, a branch line-side breaker 15 is each provided on the branch lines 11 to individually shut off the solar cell strings 102. An aggregate line-side breaker 16 is provided on the aggregate line 12 to shut off the entire solar cell array 101

The related art to the invention may include Patent Literature 1 (JP-A-2008-91828), Patent Literature 2 (JP-A-2011-66320), Patent Literature 3 (JP-A-2001-68706), and Patent Literature 4 (Japanese patent No. 3754898),

SUMMARY OF THE INVENTION

Against the problem in Patent Literature 1, the inventors have proposed a method that a malfunction in a solar cell panel is determined based on AC characteristics of the solar cell panel. In this method, AC voltage is applied from a positive side of the solar cell panel which is generating power, and AC characteristics, i.e., an impedance component of the solar cell panel is evaluated to determine malfunction therein. By applying this method to the entire solar cell string composed of plural solar cell panels connected in series, it is possible to determine malfunction in the solar cell string which is generating power.

The inventors conceived an idea of adding a function of determining malfunction such as failure, etc., in the solar cell array 101 to the solar photovoltaic junction box 61.

However, since the back-flow preventing diode 14 is provided on each of the branch lines 11 in the solar photovoltaic junction box 61 as described above, an AC voltage generator (AC source) for applying AC voltage and a measuring means for measuring an alternating current flowing in each solar cell string 102 need to be provided on the solar cell string 102 side of the back-flow preventing diode 14 when the method proposed above is applied to the solar photovoltaic junction box 61.

Accordingly, an AC voltage generator and a measuring means must be provided on each branch line 11 in order to determine malfunction in all solar cell strings 102 constituting the solar cell array 101, and there is a problem that the cost is very high in case of the solar cell array 101 with a large number of the solar cell strings 102.

Although an AC voltage generator 71 and a receiver 72 which is a measuring means may be prepared separately from the solar photovoltaic junction box 61 so that malfunction in each of the solar cell strings 102 is determined by sequentially switching connection, this method has a problem that it is troublesome and workability is poor when there are many solar cell strings 102, in addition, it is not possible to constantly monitor malfunction in the entire solar cell array 101.

Therefore, it is an object of the invention to provide a low-coast solar photovoltaic junction box that can function to determine a malfunction in a solar cell array and continuously monitor a malfunction in the entire solar cell array during the power generation.

(1) According to one embodiment of the invention, a solar photovoltaic junction box for being electrically connected to a solar cell array comprising a plurality of solar cell strings each comprising a plurality of solar cell panels series-connected so as to collect and output power generated by each of the solar cell strings comprises a plurality of input branch lines electrically connected to the solar cell strings;

an output aggregate line that converges the plurality of branch lines to collect power inputted from each of the solar cell strings through the plurality of branch lines and to output the power;

a back-flow preventing diode provided on each of the branch lines to block a current flowing from the aggregate line toward the solar cell string;

a capacitor parallel-connected to each of the back-flow preventing diodes;

an AC voltage generator provided on the aggregate line to allow an AC voltage to be applied to the solar cell array through the aggregate line, the branch lines and the capacitor;

a measuring means for measuring an alternating current owing in the solar cell array; and a control unit comprising an malfunction determination portion for determining a malfunction in the solar cell array on the basis of the AC voltage applied by the AC voltage generator and the alternating current measured by the measuring means.

In the above embodiment (1) of the invention, the following modifications and changes can be made, (i) The measuring means is configured to measure an alternating current flowing in the aggregate line, and the malfunction determination portion is configured to determine a malfunction in the solar cell array on the basis of the AC voltage applied by the AC voltage generator and the alternating current measured by the measuring means.

(ii) The measuring means is configured to measure an alternating current flowing in each of the branch lines, and the malfunction determination portion is configured to individually determine a malfunction in the solar cell strings on the basis of the AC voltage applied by the AC voltage generator and the alternating current flowing in each of the branch lines that are measured by the measuring means.

(iii) The measuring means is configured to measure an alternating current flowing in the aggregate line, the junction box further comprises an inductor parallel-connected to the back-flow preventing diode and series-connected to the capacitor such that the capacitor and the inductor form a band path filter having a passband different in each of the branch lines, and the malfunction determination portion is configured to select one of the solar cell strings to which AC voltage to be applied by controlling a frequency of the AC voltage applied by the AC voltage generator and to individually determine a malfunction in the solar cell strings by repeatedly determining a malfunction in the selected one of the solar cell strings on the basis of the AC voltage applied by the AC voltage generator and the alternating current measured by the measuring means.

(iv) The malfunction determination portion is configured to determine a malfunction in the solar cell array while the solar cell string generates power.

Points of the Invention

According to one embodiment of the invention, a solar photovoltaic junction box is configured such that capacitors (capacitive elements) parallel-connected to the respective back-flow preventing diodes for passing an alternating current, an AC voltage generator provided on the aggregate line allowing AC voltage to be applied to the solar cell array, a measuring means for measuring an alternating current flowing in the solar cell array, a control unit having an malfunction determination portion to determine a malfunction in the solar cell array on the basis of the AC voltage applied by the AC voltage generator and the alternating current measured by the measuring means When AC voltage is applied during the power generation of each solar cell panel of the solar cell string, the AC voltage is superimposed on DC voltage being generated by the solar cell string such that the bypass diode is continuously reverse-biased. As a result, the alternating current passes through only the solar cell panel without passing through the bypass diode, so that a malfunction in the solar cell string can be accurately determined without being affected by the bypass diode.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiments of the invention will be described below in conjunction with the appended drawings.

Figure 1:
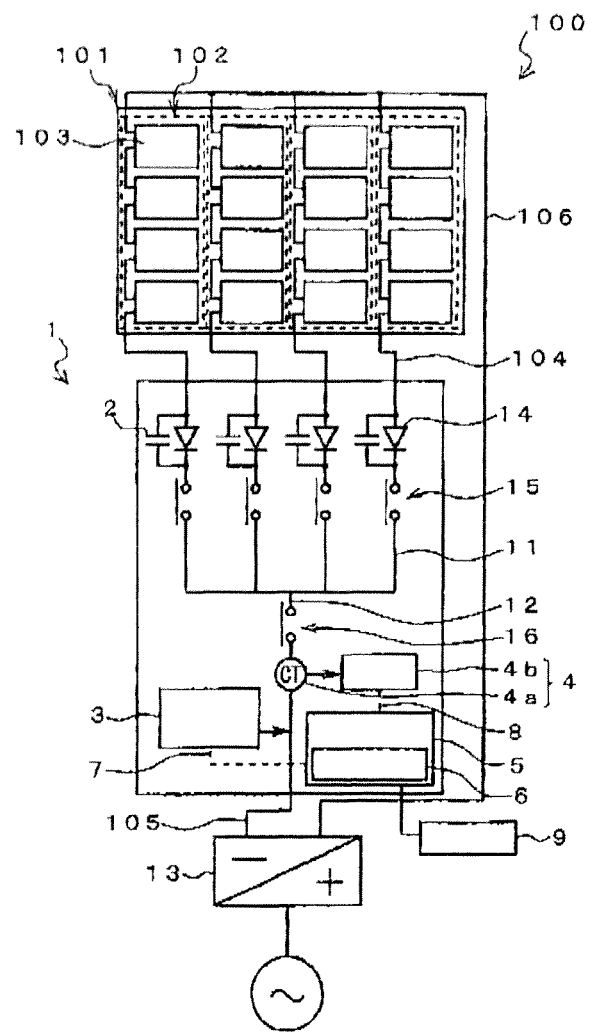
FIG. 1 is a schematic block diagram illustrating a solar photovoltaic system using a solar photovoltaic junction box in an embodiment of the present invention.

FIG. 1 is a schematic block diagram illustrating a solar photovoltaic system using a solar photovoltaic junction box in the present embodiment As shown in FIG. 1, a solar photovoltaic system 100 is mainly provided with a solar cell array 101, a solar photovoltaic junction box 1 of the invention and a power conditioner 13.

The solar cell array 101 is provided with plural solar cell strings 102 each composed of plural solar cell panels 103 connected in series. In the present embodiment, the case where the solar cell array 101 is composed of four solar cell strings 102 and each solar cell string 102 is composed of four solar cell panels 103 will be described as an example. In this regard, however, the number of the solar cell strings 102 constituting the solar cell array 101 and the number of the solar cell panels 103 constituting the solar cell string 102 are not limited thereto.

The solar photovoltaic junction box 1 is electrically connected to the solar cell array 101 to collect power generated by each of the solar cell strings 102 and to output the power to the power conditioner 13.

The solar photovoltaic junction box 1 is provided with plural (four in the present embodiment) input branch lines 11 electrically connected to the respective solar cell strings 102 and an output aggregate line 1 which converges the plural branch lines 11 to collect power input from each of the solar cell strings 102 via the plural branch lines 11 and to output the power.

Each power wire 104 extending from a positive terminal of the solar cell string 102 is electrically connected to an end of each of the branch lines 11. Another end of each of the branch lines 11 is electrically connected to an end of the aggregate line 12 and another end of the aggregate line 12 is electrically connected to a power wire 105 extending to the power conditioner 13 A power wire (DC return wire) 106 extending from a negative terminal of each solar cell string 102 is directly connected to the power conditioner 13 without interposing the solar photovoltaic junction box 1 in the present embodiment. but may be connected to the power conditioner 13 via the solar photovoltaic junction box 1.

A back-flow preventing diode 14 for blocking a current flowing from the aggregate line 12 toward the solar cell string 102 is provided on each of the branch lines 11.

In addition, a branch line-side breaker 15 is provided on each of the branch lines 11 to individually shut off the solar cell strings 102. An aggregate line-side breaker 16 is provided on the aggregate line 12 to shut off the entire solar cell array 101.

The solar photovoltaic junction box 1 in the present embodiment is further comprised of capacitors (capacitive elements) 2 connected in parallel to the respective back-flow preventing diodes 14 for passing an alternating current, an AC voltage generator 3 provided on the aggregate line 12 allowing AC voltage to be applied to the solar cell array 101 via the aggregate line 12, the branch lines 11, the capacitors 2 and the power wires 104, a measuring means 4 for measuring an alternating current flowing in the solar cell array 101, a control unit 5 having an malfunction determination portion 6 which determines malfunction in the solar cell array 101 on the basis of the AC voltage applied by the AC voltage generator 3 and the alternating current measured by the measuring means 4, and an alarm means 9.

In the solar photovoltaic junction box 1, the capacitor 2 provided in parallel to the back-flow preventing diode 14 allows AC voltage to be transmitted to each solar cell string 102 so as to bypass the back-flow preventing diode 14, which results in that the AC voltage generator 3 shared by each of the solar cell strings 102 can be provided on the aggregate line 12 on the output side (the power conditioner 13 side) of the back-flow preventing diode 14.

The control unit 5 is electrically connected to the AC voltage generator 3 via a control line 7 and AC voltage output from the AC voltage generator 3 can be thereby controlled by the control unit 5.

In the present embodiment, the measuring means 4 is configured to measure an alternating current flowing in the aggregate line 12, The alternating current flowing in the aggregate line 12 is equal to the total value of the alternating current flowing in the respective solar cell strings 102, i e., the alternating current flowing in the entire solar cell array 101. The measuring means 4 is composed of a current transformer (CT) 4a provided on the aggregate line 12 and a receiver (AC ammeter) 4b connected to the current transformer 4a. The receiver 4b is electrically connected to the control unit 5 via a control line 8 so that measurement results by the measuring means 4 are input to the control unit 5.

Meanwhile, in the present embodiment, the malfunction determination portion 6 is configured to determine malfunction in the entire solar cell array 101 on the basis of AC voltage V applied by the AC voltage generator 3 and an alternating current I measured by the measuring means 4. In detail, the malfunction determination portion 6 is configured to calculate V/I as a ratio of the AC voltage V to the alternating current I, i.e., an impedance component Z of the entire solar cell array 101, and then to determine that malfunction is present in the solar cell array 101 when the value thereof is greater than a preset threshold value. Once it is determined that malfunction is present in the solar cell array 101, the malfunction determination portion 6 transmits a malfunction signal to the alarm means 9.

Although the present embodiment is configure to determined malfunction in the solar cell array 101 on the basis of V/I as a ratio of the AC voltage V to the alternating current I (i e., the impedance component Z), it is not limited thereto, and malfunction in the solar cell array 101 may be determined on the basis of a phase difference of the AC voltage V and the alternating current I. The malfunction determination portion 6 is installed on the control unit 5 and is implemented by appropriately combining memory (RAM, ROM), CPU, I/O interface and software, etc.

Since the present embodiment is configured to control the AC voltage generator 3 by control unit 5, it is possible to use the reading thereof as the AC voltage V used by the malfunction determination portion 6 for determining malfunction. However, it is not limited thereto and an AC voltmeter may be placed at an exit of the AC voltage generator 3 to measure the AC voltage V output by the AC voltage generator 3 so that the measured value thereof is used to determine malfunction.

In the solar photovoltaic junction box 1, the malfunction determination portion 6 is configured to determine malfunction in the solar cell array 101 while the solar cell strings 102 are generating power. The reason thereof will be explained using FIG. 2.

Figure 2:
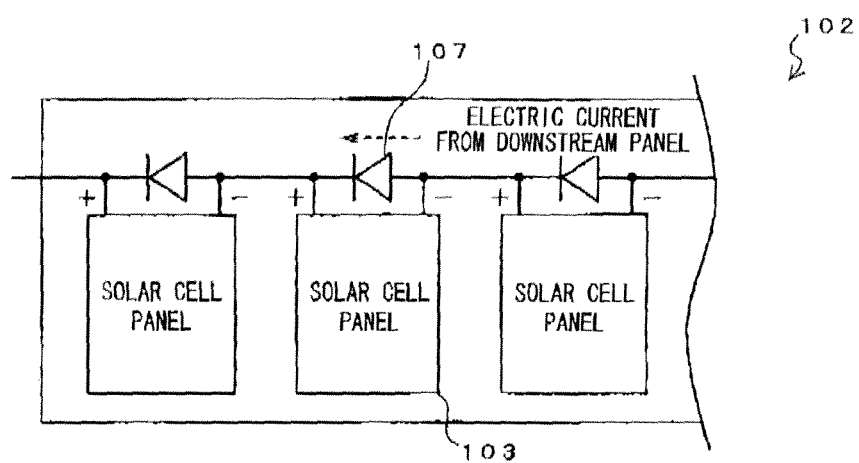
FIG. 2 is a schematic block diagram illustrating a solar cell string of the solar photovoltaic system in FIG. 1.

Plural solar cell panels 103 are connected in series in the solar cell string 102 as shown in FIG. 2, and a bypass diode 107 for bypassing a current from a downstream solar cell panel 103 is each provided between positive and negative terminals of each solar cell panel 103. Accordingly, in case of applying AC voltage while the solar cell string 102 (the solar cell panel 103) is not generating power, an alternating current passes through not only the solar cell panel 103 but also the bypass diode 107 and it is difficult to determine malfunction in the solar cell string 102, i.e., malfunction in each of the solar cell panels 103 constituting the solar cell string 102.

On the other hand, if AC voltage is applied while each solar cell panel 103 of the solar, cell string 102 is generating power, the AC voltage is superimposed on DC voltage being generated by the solar cell string 102 and the bypass diode 107 is constantly reverse-biased. As a result, the alternating current passes through only the solar cell panel 103 without passing through the bypass diode 107, which allows malfunction in the solar cell string 102 to be accurately determined without being affected by the bypass diode 107.

The alarm means 9 is to raise an alarm to inform an administrator that the malfunction determination portion 6 has determined malfunction in the solar cell array 101. The configuration of the alarm means 9 is not specifically limited and, for example, it is configured to light a warning lamp to inform the administrator that malfunction in the solar cell array 101 is detected when receiving a malfunction signal from the malfunction determination portion 6, and to display the detection of the malfunction in the solar cell array 101 on a monitor, etc., and around the same time, to transmit an alarm message to a mobile phone, etc., of the administrator to notice that malfunction in the solar cell array 101 has been detected.

Next, a control flow for malfunction determination processing in the malfunction determination portion 6 of the solar photovoltaic junction box 1 will be explained using FIG. 3. The malfunction determination processing is performed while the solar cell panel 103 is generating power.

A trigger for performing the malfunction determination processing is not specifically limited, and it may be performed when the administrator desires or may be automatically performed at a preset time. Alternatively, it may be performed at predetermined time intervals (e.g., every one hour) within a preset time range (e.g., during the daytime when power is being generated).

Figure 3:
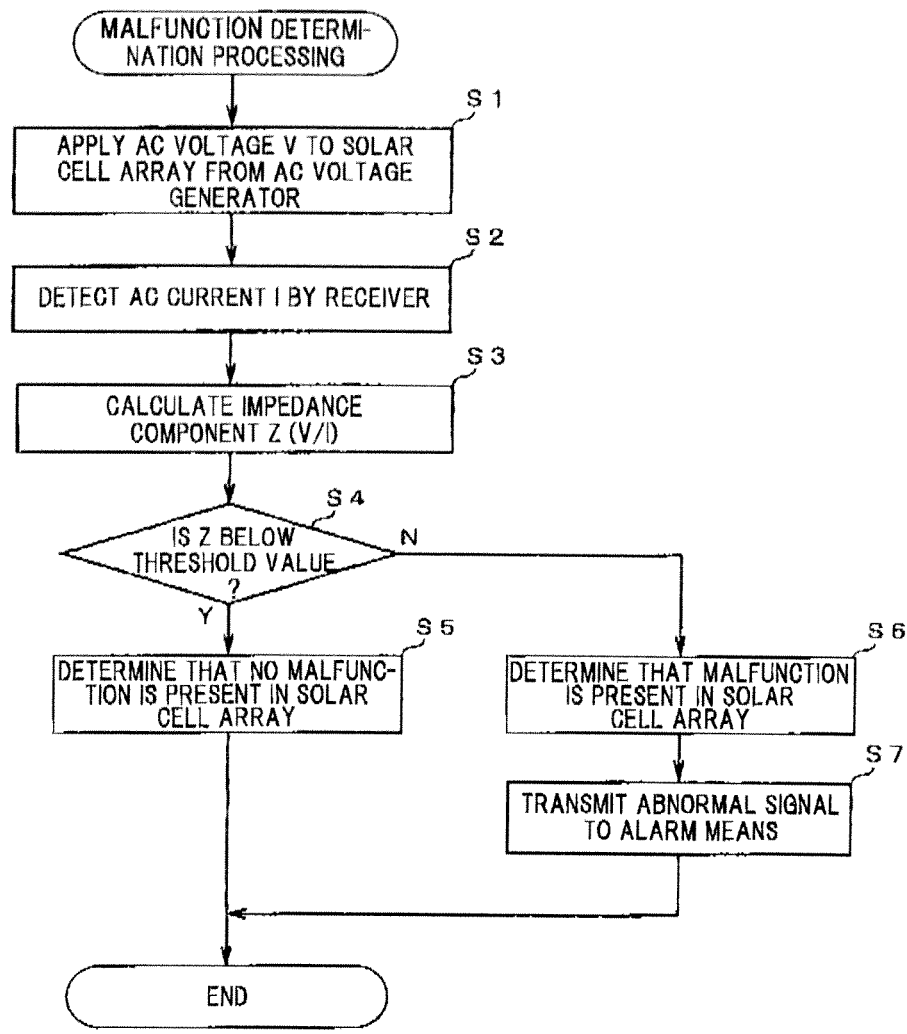
FIG. 3 is a flow chart showing a control flow for malfunction determination processing in an malfunction determination portion of the solar photovoltaic junction box in FIG. 1.

As shown in FIG. 3, in the malfunction determination processing, a signal is firstly transmitted to the AC voltage generator 3 from the control unit 5 and the AC voltage V is then applied to the solar cell array 101 from the AC voltage generator 3 in Step S1. Subsequently, the alternating current I flowing in the aggregate line 12 is measured by the receiver 4b of the measuring means 4 in Step S2.

After that, the malfunction determination portion 6 calculates V/I as a ratio of the AC voltage V to the alternating current I, i.e., the impedance component Z of the entire solar cell array 101 in Step S3 and it is judged whether or not the impedance component Z is below the preset threshold value in Step S4.

When judgment in Step S4 is YES, the malfunction determination portion 6 determines that no malfunction is present in the solar cell array 101 in Step S5 and the processing is ended.

When judgment in Step S4 is NO, the malfunction determination portion 6 determines that malfunction is present in the solar cell array 101 in Step S6, a malfunction signal is then transmitted to the alarm means 9 in Step S7, and subsequently, the processing is ended.

Effects of the present embodiment will be described.

In the solar photovoltaic junction box 1 of the present embodiment, the capacitor 2 for passing an alternating current is connected in parallel to the back-flow preventing diode 14, the AC voltage V is applied to each solar cell string 102 from the AC voltage generator 3 provided on the aggregate line 12 and malfunction in the solar cell array 101 is determined on the basis of the applied AC voltage V and the alternating current I flowing in each solar cell string 102 which is measured by the measuring means 4.

The capacitor 2 connected in parallel to the back-flow preventing diode 14 allows the AC voltage generator 3 shared by each of the solar cell strings 102 and the measuring means 4 to be provided on the aggregate line 12 on the output side (the power conditioner 13 side) of the back-flow preventing diode 14 and it is thus possible to realize a low-cost solar photovoltaic junction box 1 with a function of determining malfunction in the solar cell array 101.

Figure 7:
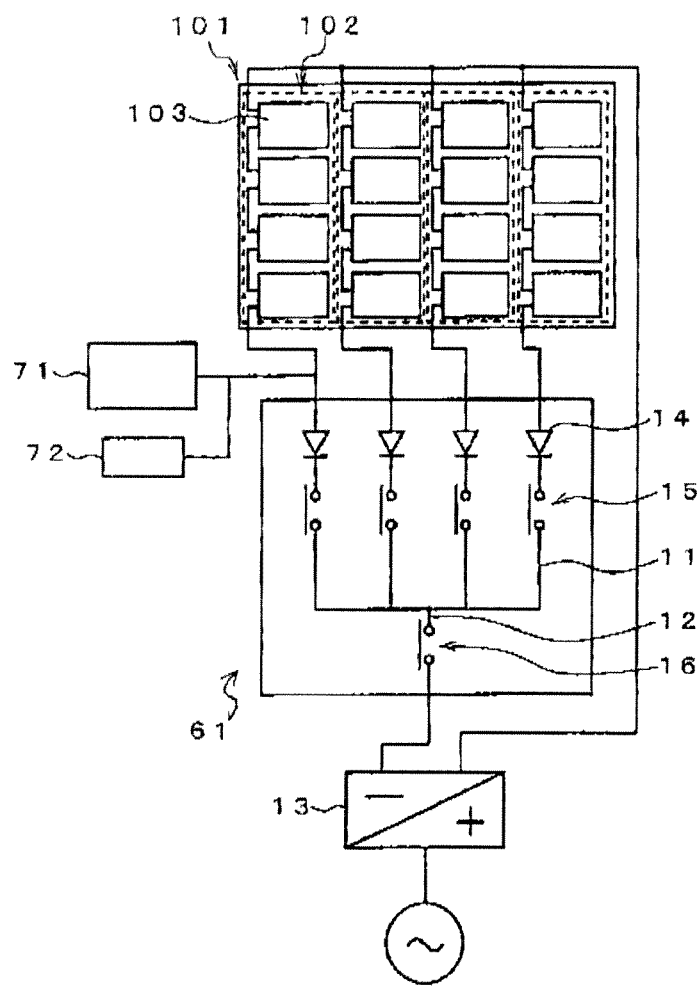
FIG. 7 is a schematic block diagram illustrating the conventional solar photovoltaic junction box in FIG. 6 in the case where an AC voltage generator and a receiver are prepared and malfunction in each solar cell string is determined by sequentially switching connection.

In addition, it is not necessary to switch connection of the solar cell string 102 one by one in the solar photovoltaic junction box 1 unlike the case of separately preparing the AC voltage generator 71 and the receiver 72 as explained for FIG. 7, and it is possible to constantly and automatically monitor malfunction in the entire solar cell array 101 which is generating power. The solar photovoltaic junction box 1 is particularly suitable for a large-scale solar photovoltaic system 100 provided with a large number of the solar cell strings 102 since plural solar cell strings 102 can be monitored all together.

Next, another embodiment of the invention will be described.

Figure 4:
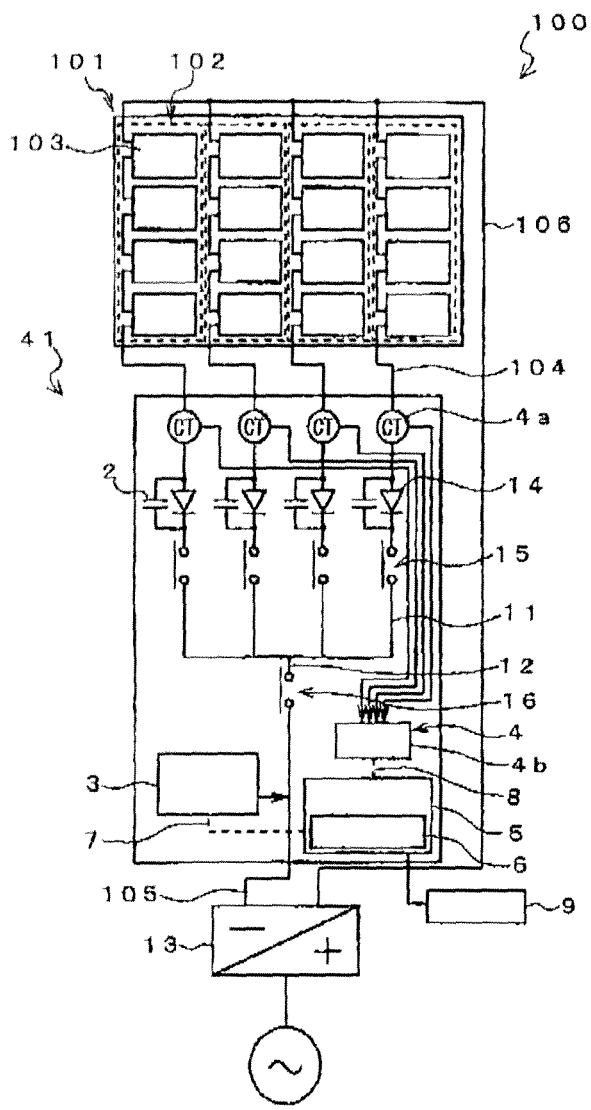
FIG. 4 is a schematic block diagram illustrating a solar photovoltaic system using a solar photovoltaic junction box in another embodiment of the invention.

A solar photovoltaic junction box 41 shown in FIG. 4 is based on the solar photovoltaic junction box 1 in FIG. 1, which is configured to measure the alternating currents I flowing the respective branch lines 11 and in which the malfunction determination portion 6 is configured to individually determine malfunction in the solar cell strings 102 on the basis of the AC voltage V applied by the AC voltage generator 3 and the alternating currents I flowing in the respective branch lines 11 which are measured by the measuring means 4.

The measuring means 4 is configured such that the current transformer 4a is provided on each of the branch lines 11 and the receiver 4b sequentially measures the alternating current I flowing in each of the branch lines 11 by sequentially switching and selecting the current transformer 4a. The alternating current I flowing in each of the branch lines 11 is equal to an alternating current flowing in each of the corresponding solar cell strings 102.

The malfunction determination portion 6 is configured to sequentially receive values of the alternating currents I flowing in the respective branch lines 11 from the receiver 4b, to calculate the impedance component Z of each solar cell string 102 and to individually determine malfunction in each solar cell string 102.

Although FIG. 4 shows the case where the current transformer 4a is provided on the solar cell array 101 side of the back-flow preventing diode 14, the current transformer 4a may be provided at any positions on the branch line 11 and may be provided on the output side (the power conditioner 13 side) of the back-flow preventing diode 14.

While the solar photovoltaic junction box 11 in FIG. 1 only determines malfunction in the entire solar cell array 101, the solar photovoltaic junction box 41 in FIG. 4 can individually determine which of the solar cell strings 102 has a malfunction.

Figure 5:
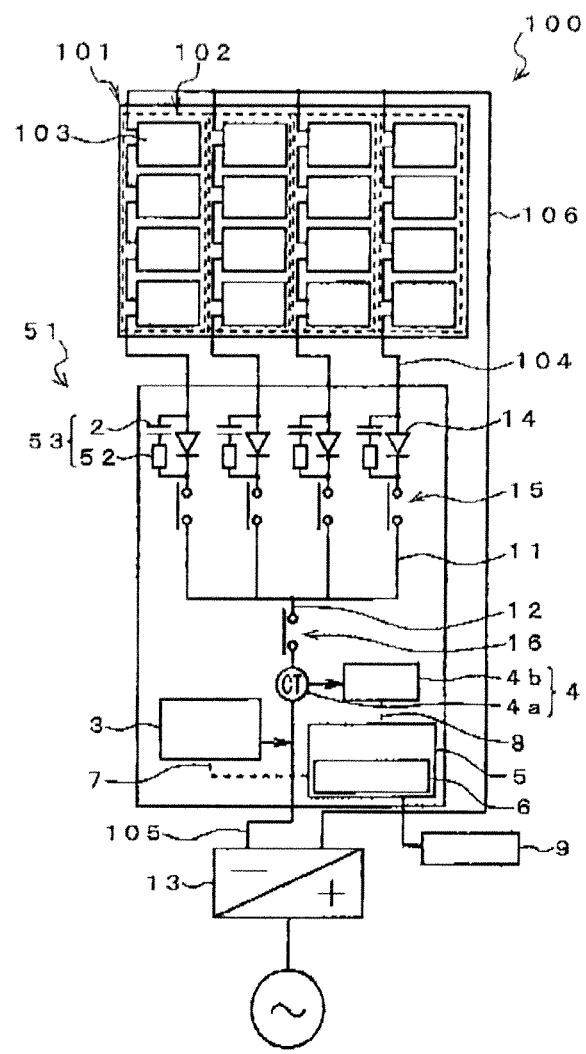
FIG. 5 is a schematic block diagram illustrating a solar photovoltaic system using a solar photovoltaic junction box in still another embodiment of the invention.
Figure 6:
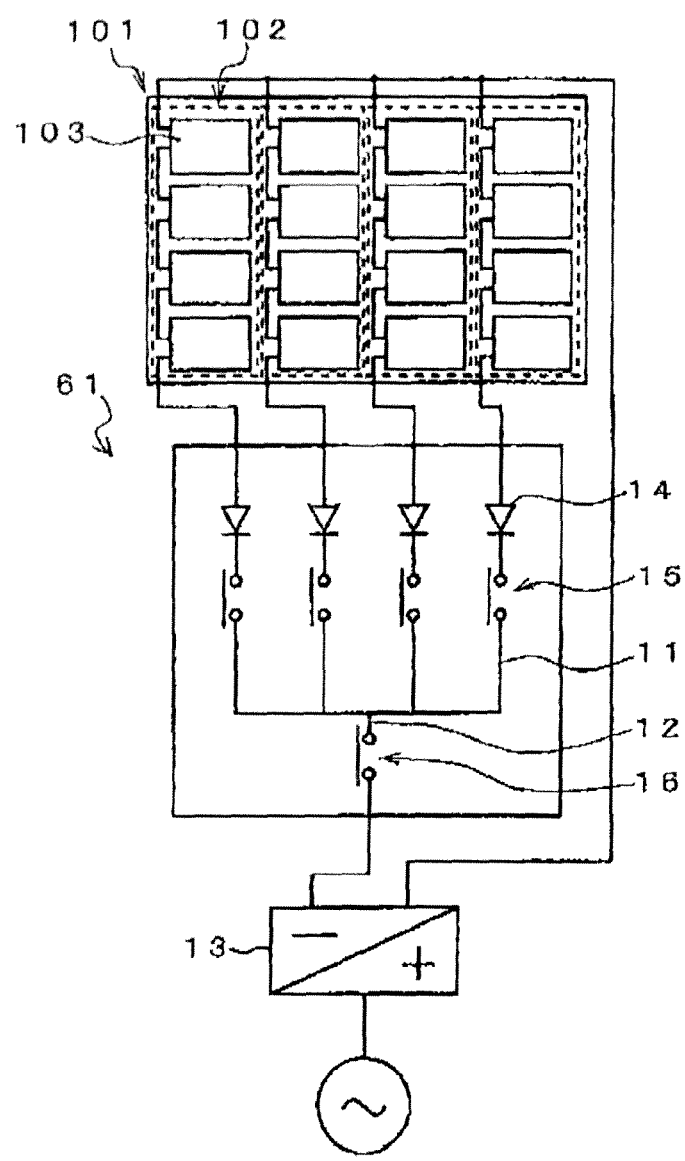
FIG. 6 is a schematic block diagram illustrating a solar photovoltaic system using a conventional solar photovoltaic junction box.

A solar photovoltaic junction box 51 shown in FIG. 5 is based on the solar photovoltaic junction box 1 in FIG. 1, in which an inductor (inductive element) 52 is provided in parallel to the back-flow preventing diode 14 as well as in series with the capacitor 2 such that the capacitor 2 and the inductor 52 form a band path filter 53 having a passband (a passing frequency band) different in each branch line 11.

In the solar photovoltaic junction box 51, the malfunction determination portion 6 is configured such that the solar cell string 102 to which AC voltage is applied is selected by controlling frequency of the AC voltage applied by the AC voltage generator 3 and malfunction in the solar cell strings 102 is individually determined by repeatedly determining malfunction in the selected solar cell string 102 on the basis of the AC voltage V applied by the AC voltage generator 3 and the alternating current I measured by the measuring means 4. In the solar photovoltaic junction box 51, the measuring means 4 is configured to measure an alternating current flowing in the aggregate line 12 in the same manner as the solar photovoltaic junction box 1 shown in FIG. 1.

Alternatively, it is possible to configure such that AC voltage in which output frequency is swept within a predetermined band is output from the AC voltage generator 3, a frequency characteristic of the alternating current is measured at the receiver 4b and malfunction in each of the solar cell strings 102 is determined all together on the basis of a frequency characteristic of AC voltage applied by the AC voltage generator 3 and the frequency characteristic of the alternating current measured by the receiver 4b.

The solar photovoltaic junction box 51 can individually determine which of the solar cell strings 102 has a malfunction in the same manner as the solar photovoltaic junction box 41 in FIG. 4. Furthermore, while the current transformer 4a needs to be provided for each branch line 11 in the solar photovoltaic junction box 41 in FIG. 4, it is only necessary to provide the inductor 52 for every branch line 11 in the solar photovoltaic junction box 51 in FIG. 5, which is very low cost.

It should be noted that the invention is not intended to be limited to the above-mentioned embodiments, and the various kinds of changes can be made without departing from the gist of the invention.

What is claimed is:

1. A solar photovoltaic junction box for being electrically connected to a solar cell array comprising a plurality of solar cell strings each comprising a plurality of solar cell panels series-connected so as to collect and output power generated by each of the solar cell strings, comprising:
   a plurality of input branch lines electrically connected to the solar cell strings;
   an output aggregate line that converges the plurality of branch lines to collect power inputted from each of the solar cell strings through the plurality of branch lines and to output the power;
   a back-flow preventing diode provided on each of the branch lines to block a current flowing from the aggregate line toward the solar cell string;

a capacitor parallel connected to each of the back-flow preventing diodes;

an AC voltage generator provided on the aggregate line to allow an AC voltage to be applied to the solar cell array through the aggregate line, the branch lines and the capacitor;

a measuring means for measuring an alternating current flowing in the solar cell array; and a control unit comprising an malfunction determination portion for determining a malfunction in the solar cell array on the basis of the AC voltage applied by the AC voltage generator and the alternating current measured by the measuring means.

2. The solar photovoltaic junction box according to claim 1, wherein the measuring means is configured to measure an alternating current flowing in the aggregate line, and wherein the malfunction determination portion is configured to determine a malfunction in the solar cell array on the basis of the AC voltage applied by the AC voltage generator and the alternating current measured by the measuring means.

3. The solar photovoltaic junction box according to claim 1, wherein the measuring means is configured to measure an alternating current flowing in each of the branch lines, and wherein the malfunction determination portion is configured to individually determine a malfunction in the solar cell strings on the basis of the AC voltage applied by the AC voltage generator and the alternating current flowing in each of the branch lines that are measured by the measuring means.

4. The solar photovoltaic junction box according to claim 1, wherein the measuring a s is configured to measure an alternating current flowing in the aggregate line, wherein the junction box further comprises an inductor parallel-connected to the back-flow preventing diode and series-connected to the capacitor such that the capacitor and the inductor form a band path filter having a passband different in each of the branch lines, and wherein the malfunction determination portion is configured to select one of the solar cell strings to which AC voltage to be applied by controlling a frequency of the AC voltage applied by the AC voltage generator and to individually determine a malfunction in the solar cell strings by repeatedly determining a malfunction in the selected one of the solar cell strings on the basis of the AC voltage applied by the AC voltage generator and the alternating current measured by the measuring means.

5. The solar photovoltaic junction box according to claim 1, wherein the malfunction determination portion is configured to determine a malfunction in the solar cell array while the solar cell string generates power.

6. The solar photovoltaic junction box according to claim 2, wherein the malfunction determination portion is configured to determine a malfunction in the solar cell array while the solar cell string generates power.

7. The solar photovoltaic junction box according to claim 3, wherein the malfunction determination portion is configured to determine a malfunction in the solar cell array while the solar cell string generates power.

8. The solar photovoltaic junction box according to claim 4, wherein the malfunction determination portion is configured to determine a malfunction in the solar cell array while the solar cell string generates power.

* * * * *